(12) United States Patent
Fenelon

(10) Patent No.: US 11,903,366 B2
(45) Date of Patent: Feb. 20, 2024

(54) LEASH VACUUM APPARATUS

(71) Applicant: Floy Fenelon, Valley Stream, NY (US)

(72) Inventor: Floy Fenelon, Valley Stream, NY (US)

( * ) Notice: Subject to any disclaimer, the term of this patent is extended or adjusted under 35 U.S.C. 154(b) by 336 days.

(21) Appl. No.: 17/385,992

(22) Filed: Jul. 27, 2021

(65) Prior Publication Data

US 2022/0095586 A1 Mar. 31, 2022

Related U.S. Application Data

(60) Provisional application No. 63/084,257, filed on Sep. 28, 2020.

(51) Int. Cl.
*A01K 23/00* (2006.01)
*A01K 27/00* (2006.01)

(52) U.S. Cl.
CPC .......... *A01K 23/005* (2013.01); *A01K 27/003* (2013.01)

(58) Field of Classification Search
CPC ...... A01K 23/005; A01K 27/003; A01K 1/03; B65F 1/1415
USPC ..................................... 294/1.3, 1.4
See application file for complete search history.

(56) References Cited

U.S. PATENT DOCUMENTS

| | | | | |
|---|---|---|---|---|
| 7,703,170 B2 * | 4/2010 | Orubor | ................. | E01H 1/0827 15/322 |
| 8,100,445 B1 * | 1/2012 | Brar | ..................... | A01K 27/004 119/796 |
| 8,196,980 B1 * | 6/2012 | Banks | .................... | E01H 1/1206 294/1.3 |
| 8,418,659 B2 * | 4/2013 | Harruna | ............... | A01K 27/004 119/796 |
| 9,462,789 B2 * | 10/2016 | Beck | ...................... | A01M 29/22 |
| 9,974,282 B2 * | 5/2018 | Castano | ................ | E01H 1/1206 |
| 2013/0152869 A1 * | 6/2013 | Morton | ................ | A01K 27/003 119/665 |
| 2014/0159398 A1 * | 6/2014 | Reynolds | ............... | E01H 1/1206 55/374 |
| 2015/0075447 A1 * | 3/2015 | Chefetz | ................ | A01K 27/004 119/796 |
| 2016/0309972 A1 * | 10/2016 | Price | ..................... | E01H 1/1206 |
| 2016/0369462 A1 * | 12/2016 | Mc Fadden | ........... | E01H 1/1206 |
| 2017/0037589 A1 * | 2/2017 | Rivadeneira | ........... | B01D 46/02 |
| 2017/0339921 A1 * | 11/2017 | Castano | ............... | A01K 23/005 |
| 2020/0060237 A1 * | 2/2020 | Prudhomme | ........ | A01K 23/005 |

* cited by examiner

*Primary Examiner* — Paul T Chin
(74) *Attorney, Agent, or Firm* — Brennan, Manna & Diamond LLC

(57) ABSTRACT

A leash vacuum apparatus for walking a pet and cleaning up the pet's solid waste. The leash vacuum apparatus comprises a leash component, a vacuum component, and a tubing component. The leash component is configured to function as a retractable pet leash capable of restraining the pet. The vacuum component is integrated with the leash component in a housing with a handle. The vacuum component is configured to draw the pet waste into a reservoir in the housing via suction though the tubing component. A disposable solid waste bag is insertable into the reservoir to contain the waste. The tubing component is extendable for picking up the waste and retractable when not needed.

20 Claims, 5 Drawing Sheets

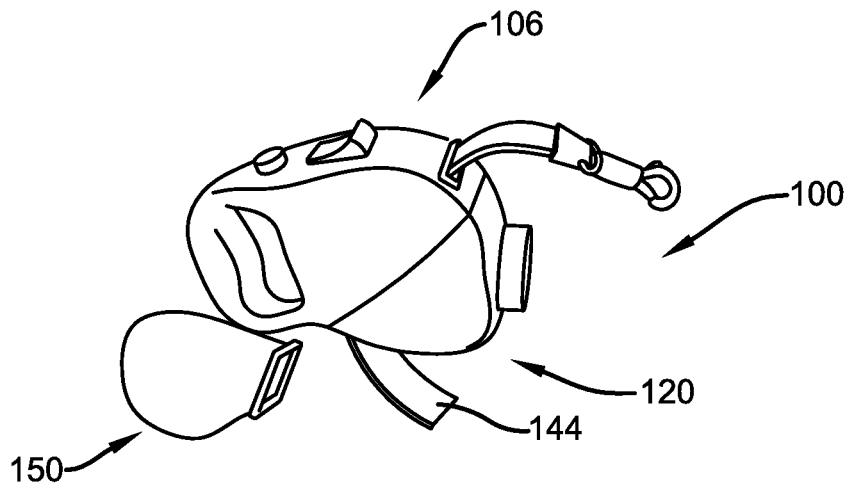
FIG. 5
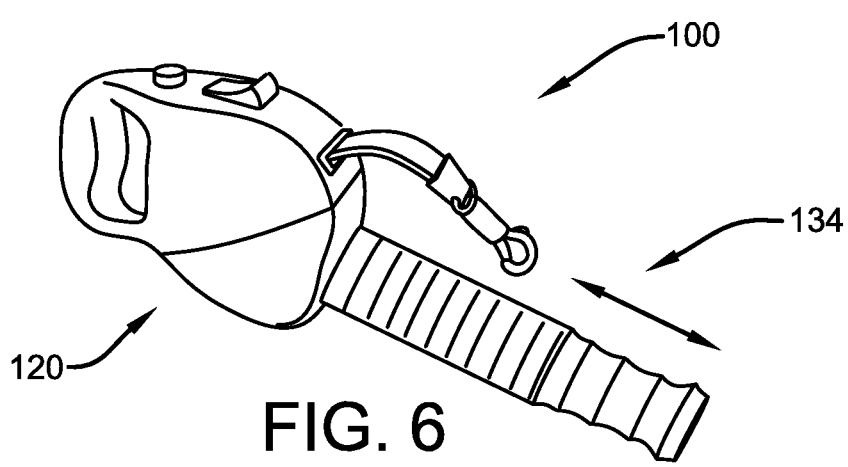
FIG. 6
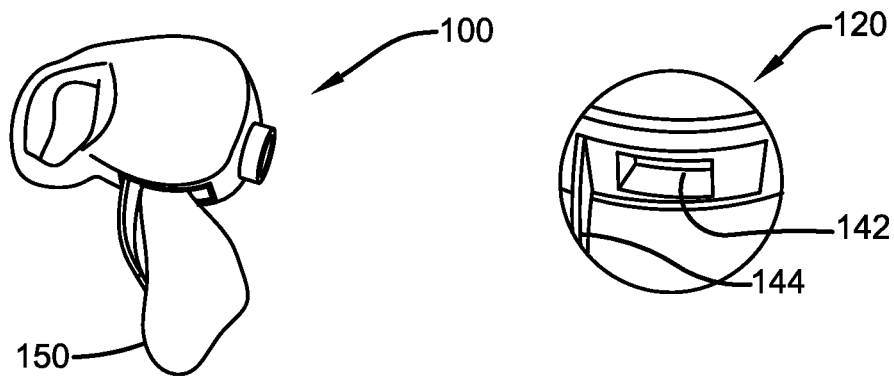
FIG. 7A
FIG. 7B

LEASH VACUUM APPARATUS

CROSS-REFERENCE TO RELATED APPLICATION

The present application claims priority to, and the benefit of, U.S. Provisional Application No. 63/084,257 which was filed on Sep. 28, 2020 and is incorporated herein by reference in its entirety.

BACKGROUND

The present invention generally relates to leash vacuum apparatus, and more specifically to a dual purpose apparatus configured to assist a user in controlling a pet outdoors and cleaning up solid waste from the pet during a walk. Accordingly, the present specification makes specific reference thereto. However, it is to be appreciated that aspects of the present invention are also equally amenable to other like applications, devices and methods of manufacture.

Pet owners are responsible for ensuring the health and safety of their pets. Pets, such as dogs, require daily exercise and frequent trips outdoors to empty their bowels. Many dogs require a restraint, such as a leash, when outdoors. Additionally, many areas have laws that require dogs to be leashed when in public. There are also laws requiring pet owners to clean up any solid waste when their pet is in a public space. As such, many dog walkers use a leash to control the animal and use disposable plastic bags to pick up solid pet waste during the walk.

Manually picking up and disposing of pet waste can be an unsanitary and disgusting process. Waste is often grabbed with a plastic bag, and people risk making a mess. The bag must then be held onto for a walk, until a proper trash receptacle is located. Even bagged, the pet waste still smells making the rest of the walk less enjoyable. The bags can tear or slip contaminating the user with pet waste. Another option is to use a manual pooper scooper type apparatus or shovel to pick up the waste. This is not practical on a walk as the user requires two hands and still would need to carry the apparatus for the rest of the walk. The entire waste disposal process can be frustrating and inconvenient while trying to keep a handle on a dog's leash. Additionally, the pet owner requires at least one hand to pick up the waste which can leave them less able to control the animal on the leash. This can even be dangerous as the owner must bend down losing leverage or if the animal is large or poorly trained.

Pet waste is also potentially dangerous as a health risk to the pet owner, other animals, and the environment. If left on the street or lawn, the waste does not just go away or fertilize the grass. Rain washes pet waste down storm drains and into waterways like rivers, bays, and beaches. This can make people sick from *Salmonella, E. coli*, and other infections. Pet waste is very toxic. The U.S. Environmental Protection Agency has estimated that the solid waste produced by just 100 dogs in two or three days (or one weekend) can contain enough bacteria to temporarily close beaches. Pet waste also provides a nitrogen source for algae blooms, which deplete the water of oxygen and can make people and animals sick.

As such, there is a significant need for an apparatus that allows the user to restrain their pet while simultaneously picking up pet waste automatically. In this manner, the improved leash vacuum apparatus of the present invention accomplishes all of the forgoing objectives, thereby providing an easy solution walking a pet and disposing of solid pet waste. The leash vacuum apparatus provides pet owners with a combination pet restraint and waste removal apparatus. The apparatus provides a way for the human to pick up pet waste with one hand and eliminates the need to use plastic bags to physically grab pet waste which can be unsanitary.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one embodiment thereof, comprises a leash vacuum apparatus. The leash vacuum apparatus is for use in walking a pet and cleaning up the pet's solid waste. The leash vacuum apparatus is a handheld unit. A plurality of disposable pet waste bags are usable with the leash vacuum apparatus for retaining the collected pet solid waste after it is collected.

The leash vacuum apparatus comprises a leash component and a vacuum component. The leash component and the vacuum component are retained in a housing with a handle. The housing may be integrated as a single piece or separable so that the leash component may be detachable from the vacuum component. The leash component comprises a leash retained by a pully within the housing. The leash is retractable around the pully and is controlled by a spring mechanism. The leash component may further comprise a brake locking mechanism configured to engage the pully and leash that is controlled by a brake button for locking the leash in place at a desired length or releasing the leash.

The vacuum component comprises a motor and a fan in electrical communication with the motor. The motor is powered by a rechargeable battery. The motor engages the fan to generate an adjustable suction strong enough to draw in the solid pet waste. The vacuum component further comprises a reservoir. The reservoir is communication with the fan to generate the suction within the reservoir. The reservoir is removable from the housing and is configured to accept one of the disposable waste bags. Once the waste bag is filled with the solid waste, it is removed from the reservoir and a reservoir door is closed over a reservoir access opening in the housing. The reservoir is communication with the fan to generate the suction within the reservoir.

The leash vacuum apparatus further comprises a tubing component. The tubing component comprises an intake end and a distal opening. The intake end of the tubing component communicates with an intake of the vacuum component. The intake end of the tubing component may be integrated permanently with the intake of the vacuum component or may be detachable when not needed. The tubing component is adjustable in length so as to extend to create a set off distance between the user of the leash vacuum apparatus and the solid pet waste, and to retract when the vacuum component is not in operation. The distal end may be nozzle shaped to create additional suction.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which:

FIG. 5 illustrates an exploded view of a reservoir of the vacuum component of the leash vacuum apparatus of the present invention in accordance with the disclosed architecture.

FIG. 6 illustrates a perspective view of the tubing component of the leash vacuum apparatus extending and retracting of the present invention in accordance with the disclosed architecture.

FIG. 7A illustrates a perspective view of a waste bag being inserted in the reservoir of the vacuum component of the leash vacuum apparatus of the present invention in accordance with the disclosed architecture.

FIG. 7B illustrates a close up view if an opening in a housing of the leash vacuum apparatus of the present invention for inserting the waste bag in accordance with the disclosed architecture.

DETAILED DESCRIPTION

Figure 1:
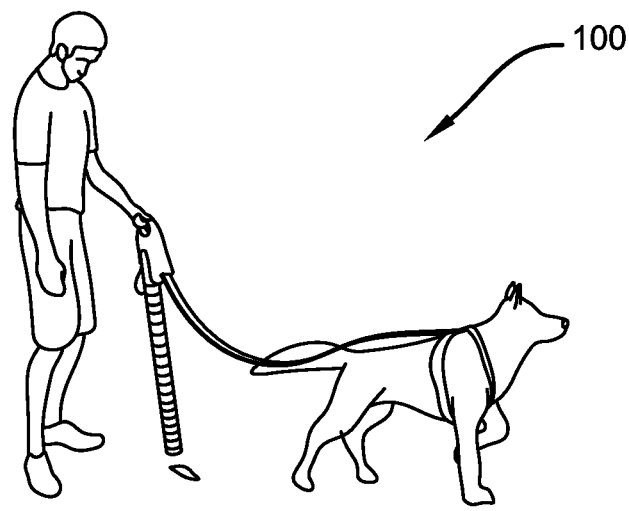
FIG. 1 illustrates a perspective view of one embodiment of a leash vacuum apparatus of the present invention restraining a pet and picking up the pet's solid waste in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They do not intend as an exhaustive description of the invention or do not limit the scope of the invention. Additionally, an illustrated embodiment need not have all the aspects or advantages shown. Thus, in other embodiments, any of the features described herein from different embodiments may be combined.

The present invention is a multipurpose dog walking apparatus comprised of a retractable leash and an extendable vacuum combined as a single device. The leash can be pulled from a housing and conveniently attached to a dog's collar. The vacuum system features an extending nozzle with an adjustable suction speed. Users can control the suction to conveniently pick up pet waste into odor- and tear-resistant bags. The bags can be easily inserted into the system to accommodate pet waste suctioning. When the vacuum is extended and activated, the user can suction up pet waste into the bag for disposal. The bag is easily removed from the leash housing when a trash receptacle is reached. The leash can be applied independently or in conjunction with the vacuum.

Regardless of independent or dual function, users can always maintain a single hand on the leash while simultaneously picking up pet waste. The invention allows users to independently retract and expand both the leash component and the vacuum component for singular or dual use, as needed. The leash vacuum apparatus suctions up solid pet waste with ease when a tubing component of the vacuum is extended allowing users to adjust the speed of the vacuum to suction waste into odor and tear-resistant waste bags. The invention offers a much more convenient system for both walking a dog and picking up his or her waste.

Referring initially to the drawings, FIG. 1 illustrates a leash vacuum apparatus 100. The leash vacuum apparatus 100 is configured for use in walking a pet and cleaning up the pet's solid waste. The leash vacuum apparatus 100 is handheld and easily operable with one hand. A plurality of disposable pet waste bags 150 as illustrated in FIG. 7A are usable with the leash vacuum apparatus 100 for retaining the collected pet solid waste for later disposal after it has been collected.

Figure 2:
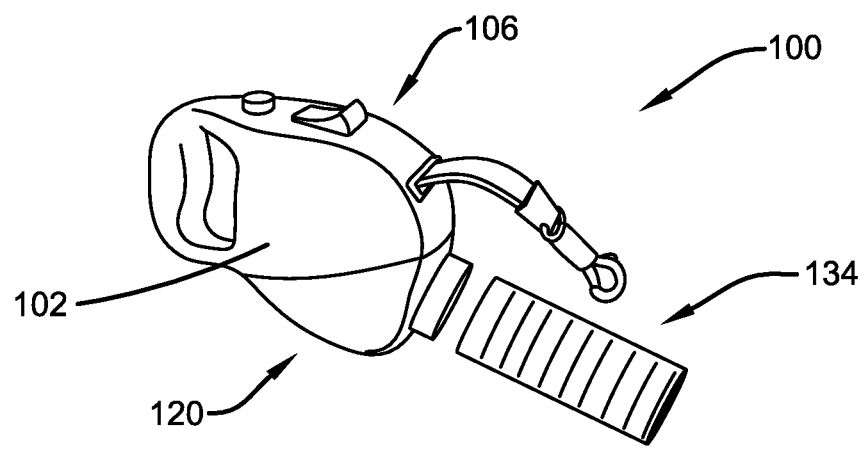
FIG. 2 illustrates a perspective view of the leash vacuum apparatus of the present invention in accordance with the disclosed architecture.

As illustrated in FIG. 2, the leash vacuum apparatus 100 comprises a leash component 106, a vacuum component 120, and a tubing component 134. The leash component 106 and the vacuum component 120 are retained together in a housing 102 of the leash vacuum apparatus 100 with a handle 104. The housing 102 may be integrated as a single piece or separable so that the leash component 106 may be detachable from the vacuum component 120. The housing 102 is typically constructed as a solid molded plastic housing capable of retaining the leash component 106 and the vacuum component 120. The leash vacuum apparatus 100 may further comprise a flashlight (not shown). The flashlight may be integrated anywhere in the housing 102 in the leash component 106 or the vacuum component 120. Alternatively, the flashlight could be attached to or integrated into the tubing component 134.

Figure 3:
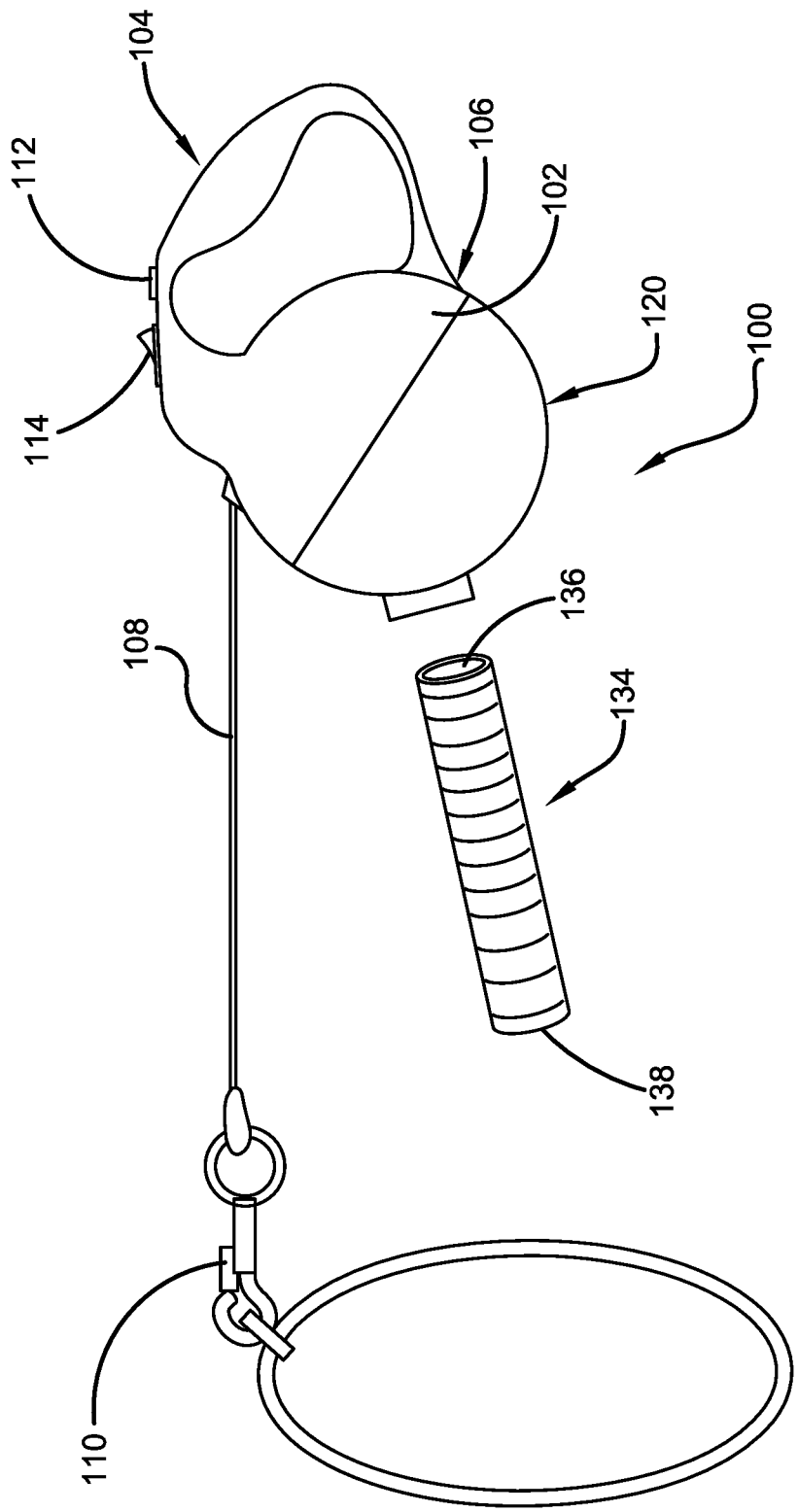
FIG. 3 illustrates a side view of a leash component, a vacuum component, and a tubing component of the leash vacuum apparatus of the present invention in accordance with the disclosed architecture.
Figure 4:
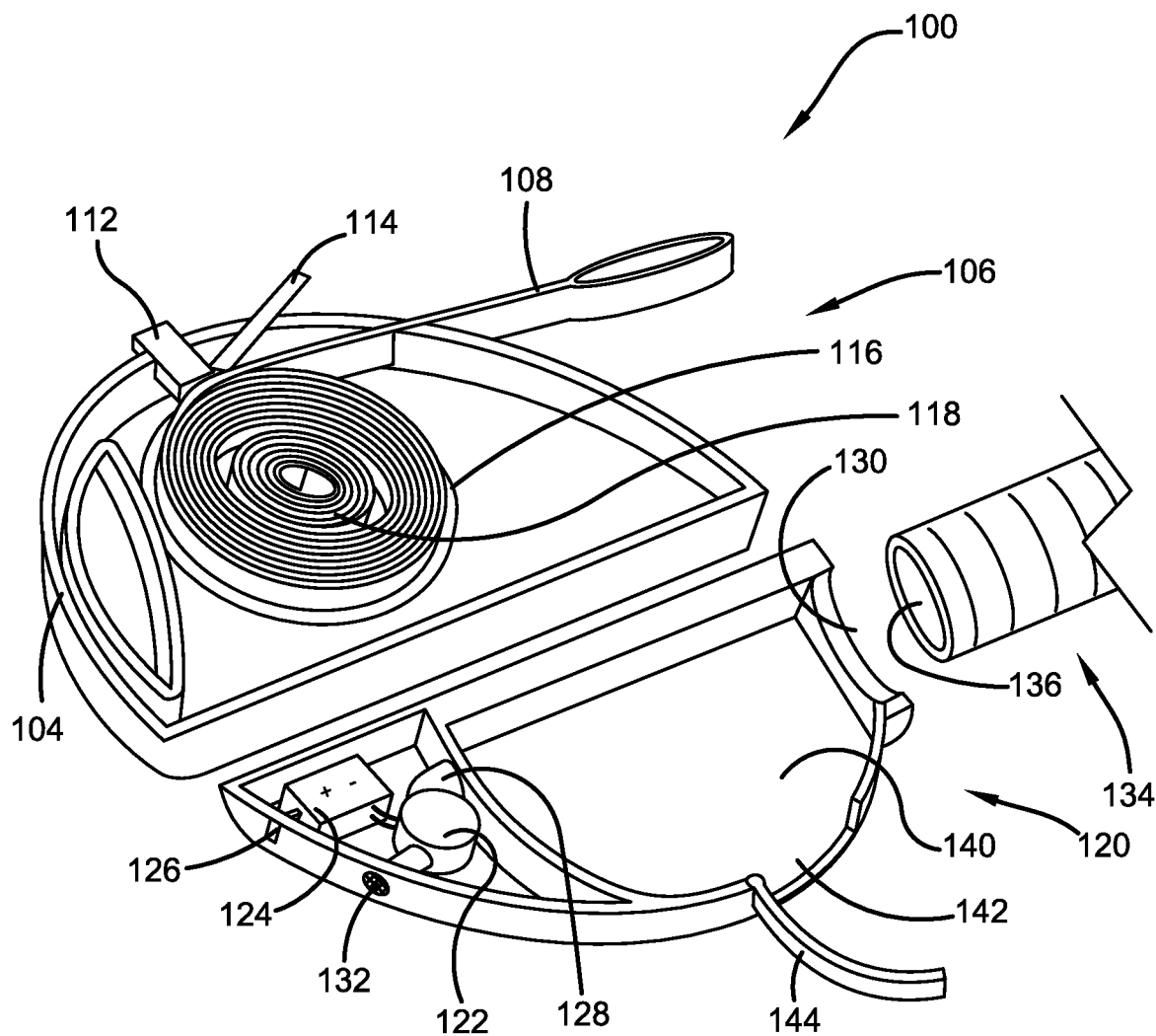
FIG. 4 illustrates an exploded cutaway view of the leash component, the vacuum component, and the tubing component of the leash vacuum apparatus of the present invention in accordance with the disclosed architecture.

As illustrated in FIGS. 3 and 4, the leash component 106 comprises a leash 108 retained by a pulley 116. The leash 108 may be a belt type or cord type leash with a hook element 110 at the distal end for attaching to a pet collar. The leash 108 is retractable around the pulley 116 and is controlled by a spring mechanism 118. The leash component 106 may further comprise a brake locking mechanism 112 that engages the pulley 116 and leash 108 controlled by a brake button 114 for locking the leash 108 in place at a desired length or releasing the leash 108 for extension or retraction.

Figure 8:
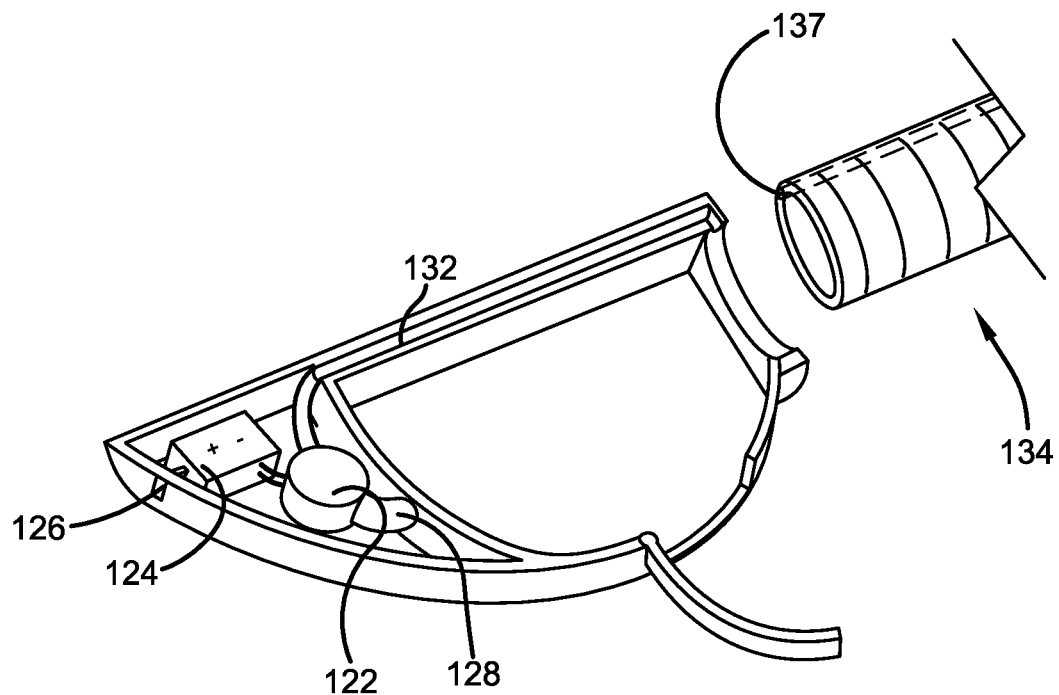
FIG. 8 illustrates an exploded cutaway view of the vacuum component and the tubing component of the leash vacuum apparatus of the present invention where the exhaust from the vacuum component is used to extend the tubing component in accordance with the disclosed architecture.

As illustrated in FIG. 4, the vacuum component 120 comprises a motor 122 and a fan 128 in electrical communication with the motor 122. The motor 122 is powered by a rechargeable battery 124. The vacuum component 120 may further comprise a charging port 126 for charging the battery 124. The motor 122 engages the fan 128 to generate an adjustable suction, as the suction pressure is adjustable, strong enough to draw in the solid pet waste. The vacuum component 120 further comprises an intake 130 leasing into the housing 102 and an exhaust port 132 exiting the housing 102. As illustrated in FIG. 8, the exhaust port 132 may be alternatively directed through the housing 102 exiting adjacent to the intake end 136 of the tubing component 134. The vacuum component 120 may produce a suction pressure of up to approximately 20 kPa or enough suction to retrieve the solid waste.

As further illustrated in FIGS. 4, 6, and 7A, the vacuum component 120 further comprises a reservoir 140. The reservoir 140 is a rigid reservoir insertable into the housing 102 through a reservoir access opening 142 and is communication with the fan 128 to generate the suction within the reservoir 140 as illustrated in FIG. 5. The reservoir 140 is removable from the housing 102 and is configured to accept one of the disposable waste bags 150. Once the waste bag 150 is filled with the solid waste, the waste bag 150 is removed from the reservoir 140 and a reservoir door 144 is closed over the reservoir access opening 142 in the housing 102. The reservoir 140 is communication with the fan 128 to generate the suction within the reservoir 140.

The tubing component 134 comprises an intake end 136 and a distal opening 138. The intake end 136 of the tubing component communicates with the intake 130 of the vacuum component 120. The intake end 136 of the tubing component 134 may be integrated permanently with the intake 130 of the vacuum component 120 or may be detachable when not needed. The tubing component 136 is adjustable in length so as to extend to create a set off distance between the user of the leash vacuum apparatus 100 and the solid pet waste, and to retract when the vacuum component 120 is not in operation. The distal opening 138 may be nozzle shaped to help create additional suction. The tubing component 136 may be a corrugated plastic tubing, telescoping, flexible, or rigid in nature.

Figure 9:
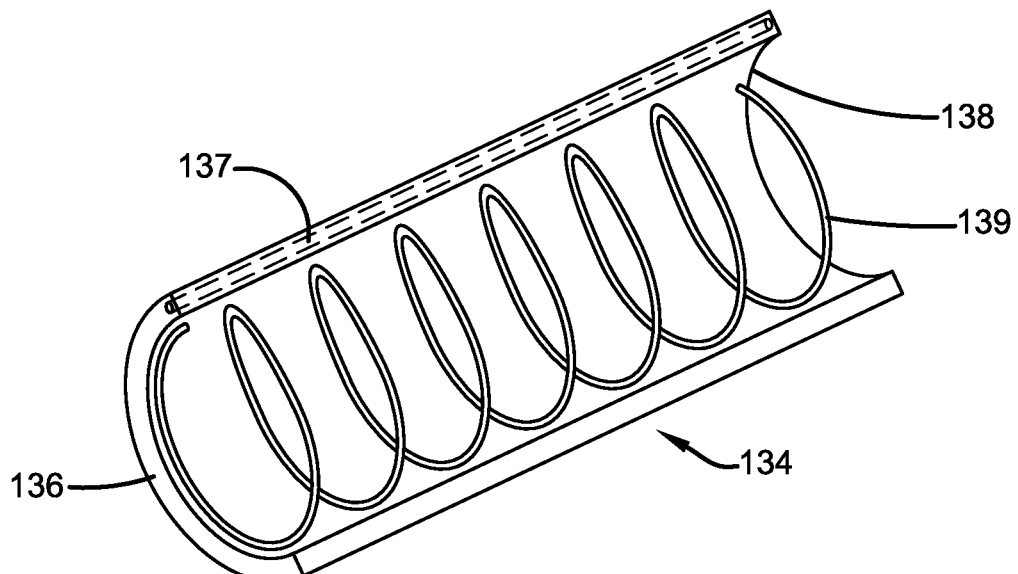
FIG. 9 illustrates a cutaway view of the tubing component of the leash vacuum apparatus of the present invention where the exhaust from the vacuum component is used to extend the tubing component in accordance with the disclosed architecture.

As illustrated in FIGS. 8 and 9, the tubing component 134 may be configured as a bilayer tubing. The exhaust directed through the housing 102 exiting adjacent to the intake end 136 of the tubing component 134 is harvested and used to propel the tubing component 134 outward in an accordion fashion through an exhaust chamber 137 within the tubing component 134 that receives the exhaust from the exhaust port 132 while never coming in direct contact or becoming a friction force or counter flow. The exhaust is therefore used to extend the tubing component 134 for use. The tubing component 134 may further comprise a spring 139, internally or externally located, extending along a length of the tubing component 134. The spring 139 contracts the tubing component 134 when the flow of exhaust stops allowing the tubing component 134 to contract.

It is contemplated that the leash vacuum apparatus 100 constructed in accordance with the present invention will be tailored and adjusted by those of ordinary skill in the art to accommodate various levels of performance demand imparted during actual use. Accordingly, while this invention has been described by reference to certain specific embodiments and examples, it will be understood that this invention is capable of further modifications. This application is, therefore, intended to cover any variations, uses or adaptations of the invention following the general principles thereof, and including such departures from the present disclosure as come within known or customary practice in the art to which this invention pertains and fall within the limits of the appended claims.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A leash vacuum apparatus comprising:
   a leash component;
   a vacuum component; and
   a tubing component in communication with the vacuum component; and
   wherein the leash component and vacuum component are retained together in a housing.

2. The leash vacuum apparatus of claim 1, wherein the tubing component is permanently integrated with an intake of the vacuum component.

3. The leash vacuum apparatus of claim 1, wherein the tubing component is detachable.

4. The leash vacuum apparatus of claim 1, wherein the tubing component is adjustable in length.

5. The leash vacuum apparatus of claim 1, wherein the vacuum component is configured to accept a waste bag for retaining a pet's solid waste.

6. The leash vacuum apparatus of claim 1, wherein the vacuum component is rechargeable.

7. The leash vacuum apparatus of claim 1, wherein a suction pressure of the vacuum component is adjustable.

8. The leash vacuum apparatus of claim 1, wherein the vacuum component comprises a removable reservoir.

9. A leash vacuum apparatus comprising:
   a leash component comprising a retractable leash;
   a vacuum component; and
   a tubing component adjustable in length in communication with and extendable from the vacuum component; and
   wherein the leash component and vacuum component are retained together in a housing.

10. The leash vacuum apparatus of claim 9, wherein the leash component further comprises a brake lock.

11. The leash vacuum apparatus of claim 9, wherein the vacuum component comprises a battery powered motor for producing a suction.

12. The leash vacuum apparatus of claim 9, wherein the vacuum component is rechargeable.

13. The leash vacuum apparatus of claim 9, wherein the vacuum component is configured to produce a suction pressure of up to 20 kPa.

14. The leash vacuum apparatus of claim 9, wherein the vacuum component comprises a removable reservoir for retaining a waste bag.

15. The leash vacuum apparatus of claim 9, wherein the leash component is detachable from the leash vacuum apparatus.

16. The leash vacuum apparatus of claim 9, wherein the tubing component is telescoping.

17. The leash vacuum apparatus of claim 9, wherein the tubing component is corrugated.

18. A leash vacuum apparatus comprising:
   a leash component comprising a retractable leash;
   a vacuum component comprising a removable reservoir configured to accept a waste bag for retaining a pet's solid waste; and
   a detachable tubing component tubing component adjustable in length in communication with and extendable from the vacuum component; and
   wherein the leash component and vacuum component are retained in a housing.

19. The leash vacuum apparatus of claim 18, wherein the leash component is detachable from the vacuum component.

20. The leash vacuum apparatus of claim 18, wherein a suction pressure of the vacuum component is adjustable.

* * * * *